Feb. 7, 1956 — J. T. DON OVERMAN — 2,733,894
WEDGE FOR FALLING TREES AND BUCKING LOGS
Filed May 17, 1952
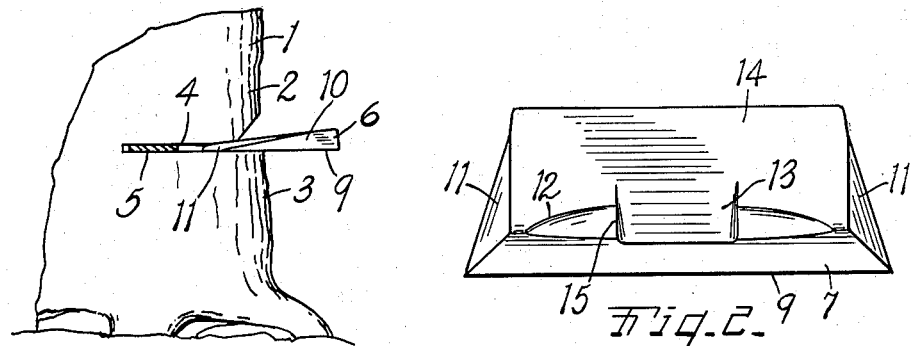
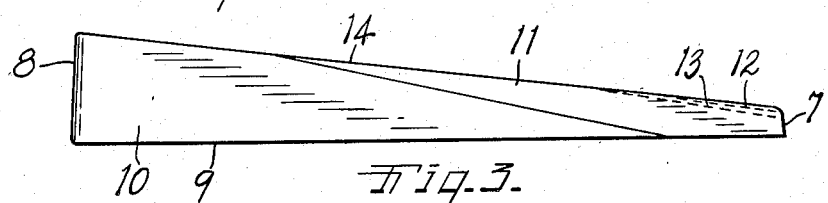
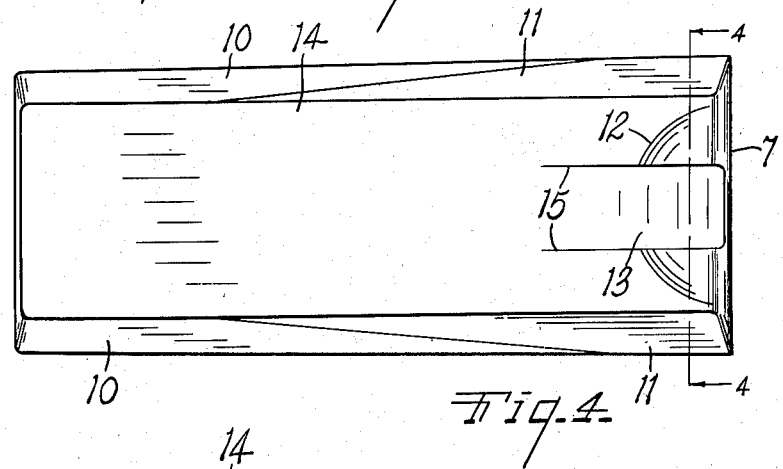
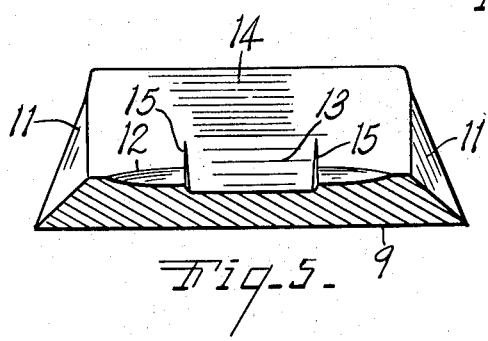
INVENTOR.
John T. Don Overman
BY
ATTORNEY.

United States Patent Office 2,733,894
Patented Feb. 7, 1956

2,733,894

WEDGE FOR FALLING TREES AND BUCKING LOGS

John T. Don Overman, Sturgis, Mich.

Application May 17, 1952, Serial No. 288,368

9 Claims. (Cl. 254—104)

This invention relates to improvements in a wedge for falling trees and bucking logs.

The principal objects of this invention are:

First, to provide a wedge which is easier to drive than wedges known heretofore.

Second, to provide a wedge which has greater lifting power than older wedges.

Third, to provide a wedge which will remain straight in the kerf while being driven.

Fourth, to provide a wedge which will lie flat along the bottom of the kerf and will not tilt therein while being driven.

Fifth, to provide a wedge which is easy to insert or start in the kerf.

Sixth, to provide a wedge which is easily and economically formed by casting the same from light metal such as magnesium.

Other objects and advantages of the invention will be apparent from a consideration of the following description and claims.

The drawings of which there is one sheet illustrate a highly practical form of the wedge.

Fig. 1 is a fragmentary elevational view of a tree trunk with the wedge in operative position in a saw kerf in the trunk, the saw which made the kerf being shown in cross section.

Fig. 2 is a front elevational view of the wedge.

Fig. 3 is a side elevational view of the wedge.

Fig. 4 is a top plan view of the wedge.

Fig. 5 is a fragmentary transverse cross sectional view through the wedge taken along the plane of the line 5—5 in Fig. 4.

It is well known in the logging art that after a saw has been run part way into a standing tree or into the side of a log that is supported at the ends the tree or log will bend tending to close the saw kerf and pinch the saw so that further sawing is impossible. It has therefore been the usual practice to drive a wedge into the outer edge of the saw kerf to hold the weight of the tree or the log and prevent it from pinching the saw. In falling trees the wedge is further used to lift or overbalance the tree after it has been almost completely cut through and to thus cause the tree to fall. Wedges of this type are well known but have heretofore been of equal width on their top and bottom surfaces. In other words the area or width presented to the upper tree portion of the kerf is equal to the width or area presented to the lower stump side of the kerf. In order to drive wedges of this type into the tree it is necessary to cause the weight supported by the wedge to force portions of the tree around the wedge in a crushing action. The friction on the wedge is very great and it is difficult to drive the wedge. Further, silnce the wedge is a tapered article being driven in to a slot or kerf having generally parallel sides there is a tendency for the wedge to tilt upwardly and downwardly so that its upper surface abuts against the tree side of the kerf and then its lower surface abuts against the stump side of the kerf.

This invention provides a wedge that is not only tapered longitudinally as the old wedges but is also tapered transversely along its side edges so that the upper face of the wedge is substantially narrower than the lower face of the wedge. When this type of wedge is inserted into a kerf the entire weight of the tree that is presented to the wedge is supported upon a narrower width and therefore smaller area of the wedge than the corresponding area of the stump that supports the bottom surface of the wedge. The resulting unit pressure between the tree and the top surface of the wedge is therefore greater than the unit pressure between the stump and the bottom surface of the wedge and crushing of the wood fibers occurs only along the narrow top surface of the wedge. This produces a groove in the end of the tree that tends to keep the wedge straight in the kerf. Further the unit pressure of the tree on the top surface of the wedge is applied along the outer edge of the kerf and causes the lower surface of the wedge to remain flat on the stump side of the kerf. I have found it desirable to notch the trunk of the tree just above the kerf so that the line of contact beween the tree and the upper surface of the wedge lies along a line between the outer edge of the stump and the inner end of the wedge as is illustrated in Fig. 1. This further causes the wedge to lie flat on the surface of the stump.

The drawings illustrate a tree 1 having an upper trunk portion 2 that is partially severed from the stump 3 by a saw kerf 4. The saw is illustrated in section at 5 and the wedge is illustrated in place in the kerf at 6. Figs. 2 to 5 illustrate details of the wedge. The wedge is generally rectangular in outline but is slightly broader at its front or inner end 7 than it is at its rear or outer end 8. The thickness and wedging angle of the wedge may vary considerably. The outer or butt end 8 of the wedge is generally perpendicular to the plane of the bottom surface 9 of the wedge but may be given a slight angle up to 2 or 3 degrees in order to permit the wedge to be cast from a mold and to permit the pattern of the wedge to be removed from the mold as part of the casting operation. The longitudinal side edges of the wedge are sharply tapered inwardly and upwardly as at 10. The degree of taper is limited only by the strength of the metal which forms the wedge as it will be appreciated that the side taper produces thin side edges that may crush if too great a load is placed upon them. I have found that angles of 36 degrees are not too great in a cast magnesium wedge. The side angles of the wedge need not be uniform and I have illustrated a wedge having side edges with compound angles as at 10 and 11.

In order to permit the wedge to be easily inserted or started in the kerf it is desirable to make the tip of the wedge as thin as possible and to do this without sacrificing the necessary thickness and strength at the tip of the wedge I have provided a semi-circular depression 12 that opens to the tip of the wedge. The thinned portion at the center of the wedge will of course enter the outer edge of the kerf more easily than the thick front corners of the wedge. The center of the tip is further thinned by a longitudinally extending inclined or recessed portion 13 that intersects the top inclined surface 14 of the wedge along parallel lines 15. The inclined portion 13 causes the end of the trunk to crush along the edges 15 and to provide in effect a tongue and groove engagement between the trunk and the top surface of the wedge. This engagement between the trunk and the wedge acts to hold the wedge straight in the kerf and it is practically impossible to twist or knock the wedge out of the kerf by an inaccurately directed blow on the butt 8 of the wedge.

I claim:
1. A wedge comprising a generally rectangular body of magnesium having a slightly narrower butt end than tip end, the side edges of said wedge being inclined inwardly and upwardly to the top surface in a compound angle exceeding three degrees, the tip end of the wedge being of reduced thickness intermediate of its sides by having a semi-circular recess formed in the upper surface thereof and extending to the tip of the wedge, the top surface of the wedge further having a central inclined portion extending downwardly to the tip below the level of the upper surface of the wedge and below the level of said semi-circular recess, the bottom side of the wedge being flat.

2. A wedge comprising a generally rectangular body of magnesium having a slightly narrower butt end than tip end, the side edges of said wedge being inclined inwardly and upwardly to the top surface in a compound angle exceeding three degrees from the vertical, the tip end of the wedge being of reduced thickness intermediate of its sides by having a central inclined portion extending downwardly to the tip below the level of the upper surface of the wedge, the bottom side of the wedge being flat.

3. A wedge comprising a generally rectangular body of magnesium, the side edges of said wedge being inclined inwardly and upwardly to the top surface in an angle exceeding three degrees from the vertical, the tip end of the wedge being of reduced thickness intermediate of its sides by having a central inclined portion extending downwardly to the tip below the level of the upper surface of the wedge, the bottom side of the wedge being flat.

4. A wedge comprising a generally rectangular body of metal, the side edges of said wedge being inclined inwardly and upwardly to the top surface in an angle substantially exceeding three degrees from the vertical.

5. A wedge comprising a solid body of generally rectangular outline with its butt end generally perpendicular to its lower surface and having its upper surface inclined downwardly to the tip, the side edges of the wedge being inclined upwardly and inwardly from the lower surface to the top surface by an angle substantially in excess of three degrees from the vertical.

6. A wedge comprising a solid body of generally rectangular outline with its butt end generally perpendicular to its lower surface and having its upper surface inclined downwardly to the tip, the side edges of the wedge being inclined upwardly and inwardly from the lower surface to the top surface by an angle of between 3 and 54 degrees from the vertical.

7. A wedge comprising a body of generally rectangular outline and having its upper surface inclined downwardly to the tip, the side edges of the wedge being inclined upwardly and inwardly from the lower surface to the top surface by an angle of between 3 and 54 degrees from the vertical.

8. A wedge comprising a body tapering in thickness from the butt to the tip and having a narrower top surface than lower surface, the top surface of the wedge having a portion recessed below the remainder of the top surface adjacent to the tip of the wedge and extending longitudinally of the wedge, the bottom side of the wedge being flat.

9. A wedge comprising a body tapering in thickness from the butt to the tip and having one wedging surface narrower than the other wedging surface.

References Cited in the file of this patent
UNITED STATES PATENTS

| Number | Name | Date |
|---|---|---|
| D. 30,618 | Hefert | Apr. 25, 1894 |
| D. 45,527 | Graham | Mar. 31, 1914 |
| D. 168,534 | Council | Jan. 6, 1953 |
| 345,153 | Latchford | July 6, 1886 |
| 426,071 | Sanford | Apr. 22, 1890 |
| 759,868 | Eich | May 17, 1904 |
| 853,546 | Githens | May 14, 1907 |
| 1,032,316 | Walters | July 9, 1912 |
| 1,198,436 | Gravel | Sept. 19, 1916 |
| 1,356,413 | Staub | Oct. 19, 1920 |
| 1,380,559 | Jespersen | June 7, 1921 |
| 1,465,302 | Haskel | Aug. 21, 1923 |
| 1,559,575 | McMillan | Nov. 3, 1925 |
| 2,359,213 | Gardner | Sept. 26, 1944 |